(12) United States Patent
Gaillard

(10) Patent No.: US 7,462,032 B2
(45) Date of Patent: Dec. 9, 2008

(54) SPLIT SPRUE BAR HAVING A DEVICE FOR PREVENTING LEAKAGE

(75) Inventor: Patrice Fabien Gaillard, Milton, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 250 days.

(21) Appl. No.: 11/454,015

(22) Filed: Jun. 15, 2006

(65) Prior Publication Data

US 2008/0050466 A1  Feb. 28, 2008

(51) Int. Cl.
*B29C 45/27* (2006.01)

(52) U.S. Cl. ...................... 425/572; 425/588

(58) Field of Classification Search ............... 425/562, 425/563, 564, 565, 566, 572, 588
See application file for complete search history.

(56) References Cited

U.S. PATENT DOCUMENTS

| | | | |
|---|---|---|---|
| 4,884,962 A * | 12/1989 | Sheffield | 425/572 |
| 4,983,117 A * | 1/1991 | von Buren et al. | 425/572 |
| 5,370,523 A | 12/1994 | Kushnir | |
| 5,968,562 A | 10/1999 | Schad et al. | |
| 7,189,071 B2 * | 3/2007 | Olaru | 425/563 |

* cited by examiner

Primary Examiner—Tim Heitbrink

(57) ABSTRACT

A collar for reducing or eliminating leakage between components that moves with respect to each other in the field of injection molding. The collar has an outer portion for receiving an inner portion. The outer portion has a tapered, partial spherical, concave, or convex surface on its inside diameter, and the inner portion has a tapered or partial spherical, convex, or concave surface on its outside diameter. In the preferred embodiment, the inner portion of the collar is operatively assembled into a cavity of the outer portion of the collar, such that the tapered surface of the inner portion is slidably mounted to the tapered surface of the outer portion. The collar is operatively mounted around the outside diameter or circumference of, preferably, a cylindrical device and between two components that move with respect to each other.

13 Claims, 17 Drawing Sheets

SPLIT SPRUE BAR HAVING A DEVICE FOR PREVENTING LEAKAGE

TECHNICAL FIELD OF THE INVENTION

The present invention generally relates to a device for reducing or eliminating leakage and more particularly to a device for reducing or eliminating leakage between components that move with respect to each other in the field of injection molding.

DESCRIPTION OF THE RELATED ART

In the field of injection molding, it is common to have components that move (e.g., slide, rotate, etc.) with respect to each other while still remaining in an assembled configuration. The challenge with this type of design is facilitating movement while precluding leakage. For example, a first part 24 of a split sprue bar 10 is shown in FIG. 1. The first part 24 of the split sprue bar 10 has a sliding nozzle 12 and a sprue bushing 14 as is known to those having ordinary skill in the art. In this design, the sliding nozzle 12 moves axially and along the sprue bushing 14. To allow the sliding nozzle 12 to move along the sprue bushing 14, a clearance 16 is provided between a contacting surface 18 of the sliding nozzle 12 and a contacting surface 20 of the sprue bushing 14. However, there are problems and disadvantages associated with providing the clearance 16 between these and other components to allow for movement in the injection molding field. Because of the significant injection pressure in the passageways 22 of the split sprue bar 10, leakage or weepage occurs between the contacting surfaces 18, 20 of the sliding nozzle 12 and the sprue bushing 14, respectively, or through the clearance 16 (see arrow A). This problem or disadvantage with the prior art devices is magnified when resins having lower viscosity are used in the injection molding process, and/or with higher pressure.

The present invention is directed to overcoming one or more of the disadvantages or problems set forth above.

SUMMARY OF THE INVENTION

In one aspect, the present invention is directed to a collar for reducing or eliminating leakage between components, which move with respect to each other in the field of injection molding.

In another aspect, the present invention is directed to a split sprue bar having springs, discs, cylinders, or the like (hereinafter "springs") to create an axial force AF between a nozzle and a sprue. The deflection of the springs creates the load or axial force AF. A collar is incorporated between the sprue and the nozzle. The collar is designed to receive the axial force AF and redirect at least a portion of the axial force AF to a radial force RF. This radial force RF acts on an inner portion of the collar forcing the inner portion tightly into engagement with the nozzle, thereby sealing off a clearance or an area adjacent the clearance where leakage or weepage may occur.

In still another aspect, the present invention is directed to stack platen assembly having springs to create an axial force AF between a nozzle and a nozzle bushing. The deflection of the springs creates the load or axial force AF. A collar is incorporated between the nozzle bushing and the nozzle. The collar is designed to receive the axial force AF and redirect at least a portion of the axial force AF to a radial force RF. This radial force RF acts on inner portion of the collar forcing the inner portion tightly into engagement with the nozzle, thereby sealing off an area adjacent the clearance where leakage of weepage may occur.

In yet another aspect, the present invention is directed to an offset stack sprue bar in engagement with a sprue bushing. The springs are used to create an axial force AF between a nozzle and a bushing. The deflection of the springs creates the load or axial force AF. The collar is incorporated between the bushing and the nozzle. The collar is designed to receive the axial force AF and redirect at least a portion of the axial force AF to a radial force RF. This radial force RF acts on an inner portion of the collar forcing the inner portion tightly into engagement with the nozzle, thereby sealing off an area adjacent the clearance where leakage or weepage may occur.

In a further aspect, the present invention is directed to a telescoping manifold assembly having a tubular manifold slidably received by a drop manifold. The springs are used to create an axial force AF between the tubular manifold and the drop manifold. The deflection of the springs creates the load or axial force AF. The collar is incorporated between the tubular manifold and the drop manifold. The collar is designed to receive the axial force AF and redirect at least a portion of the axial force AF to a radial force RF. This radial force RF acts on an inner portion of the collar forcing the inner portion tightly into engagement with the tubular manifold, thereby sealing off an area adjacent the clearance where leakage or weepage may occur.

In yet another aspect, the present invention is directed to an anti-drool apparatus having a nozzle slidably received by a bushing. The springs are used to create an axial force AF on the collars. The deflection of the springs creates the load or axial force AF. The collar is incorporated between the nozzle and the bushing. The collar is designed to receive the axial force AF and redirect at least a portion of the axial force AF to a radial force RF. This radial force RF acts on an inner portion of the collar forcing the inner portion tightly into engagement with the nozzle, thereby sealing off an area adjacent the clearance where leakage or weepage may occur.

In still yet another aspect, the present invention is directed to a linear shut-off apparatus having a rod for moving a pin via a pin and bracket assembly. The pin is slidably received by a shut-off assembly. The collar is incorporated between the pin and the shut-off assembly. The springs are used to create an axial force AF on the collar. The deflection of the springs creates the load or axial force AF. The collar is designed to receive the axial force AF and redirect at least a portion of the axial force AF to a radial force RF. This radial force RF acts on an inner portion of the collar forcing the inner portion tightly into engagement with the pin, thereby sealing off an area adjacent the clearance where leakage or weepage may occur.

In another aspect, the present invention is directed to a rotary shut-off apparatus having a rotational bracket for moving or rotating a pin. The pin is rotatably received by a shut-off assembly. The collar is incorporated between the pin and the shut-off assembly. The springs are used to create an axial force AF on the collar. The deflection of the springs creates the load or axial force AF. The collar is designed to receive the axial force AF and redirect at least a portion of the axial force AF to a radial force RF. This radial force RF acts on an inner portion of the collar forcing the inner portion tightly into engagement with the pin, thereby sealing off an area adjacent the clearance where leakage or weepage may occur.

The above aspects are merely illustrative and should not be construed as all-inclusive. The aspects should not be construed as limiting the scope of the invention. The aspects and advantages of the present invention will become apparent, as it becomes better understood from the following detailed description when taken in conjunction with the accompanying drawings.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein.

DETAILED DESCRIPTION

Figure 1:
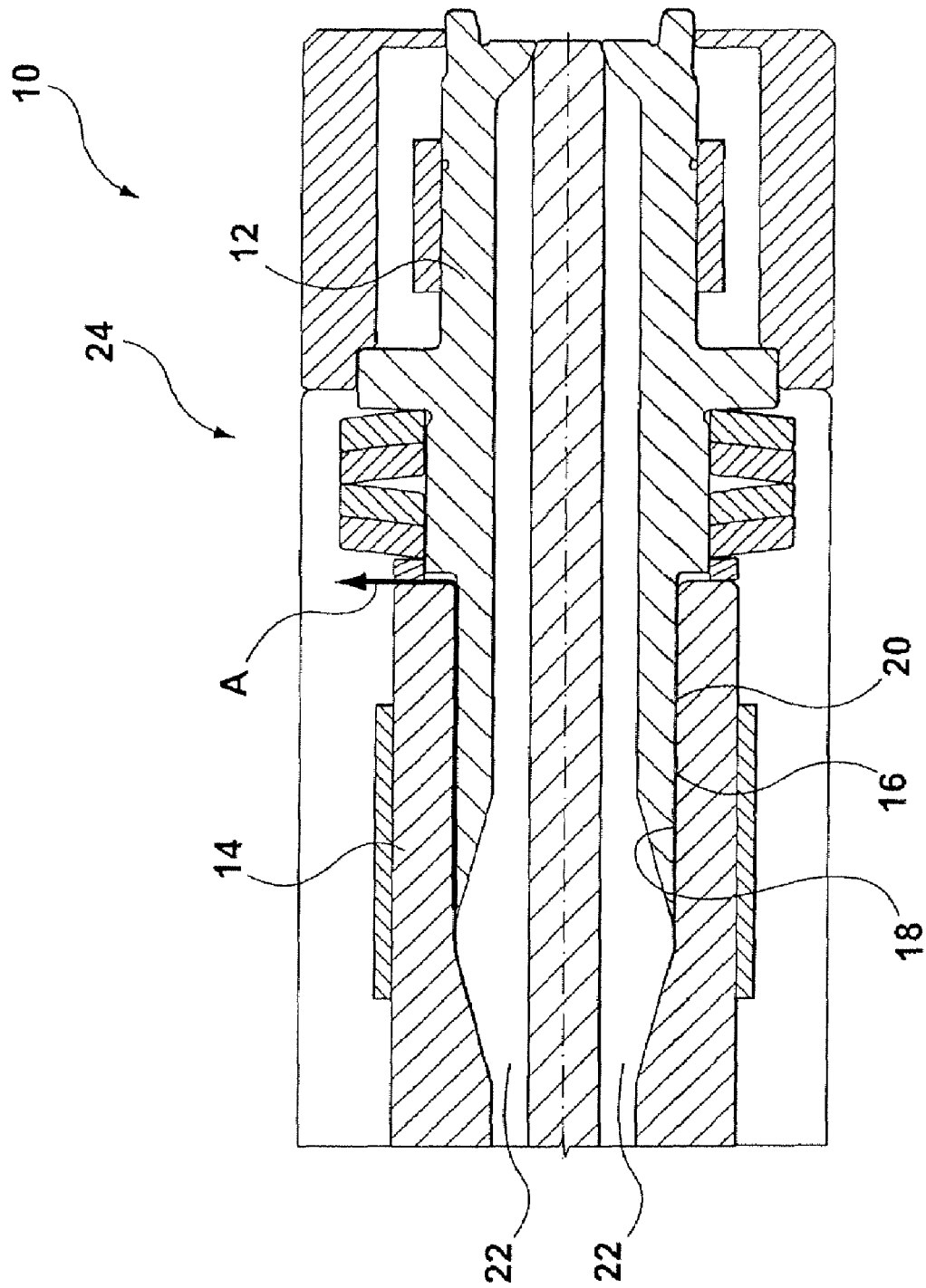
FIG. 1 is a cross-sectional view of a portion of a split sprue bar that is generally known in the prior art.

Referring now to the drawings and initially to FIG. 2, which illustrates a split sprue bar or cross over nozzle 100 (hereinafter "split sprue bar") in accordance with the present invention. The split sprue bar 100 is commonly used in melt transfer systems such as in multiple-level stack mold systems (not shown). The split sprue bar 100 of the multiple-level stack mold system must be able to transfer molten material across an interface of a level during mold cavity loading or filling while also being capable of separating into sections to allow mold separation during mold opening. Stack mold systems are generally known in the prior art and no further discussion is required. U.S. Pat. No. 5,370,523 to Kushnir describes a known multiple-level stack mold system and is hereby incorporated by reference.

The split sprue bar 100 has two parts 102, 104, which when joined define a passageway 106 that extends across an interface 108. In the embodiment shown, the flow of molten material travels from right to left from the passageway 106 of a first part 102 to the passageway 106 of a second part 104 during mold cavity (not shown) loading or filling. After filling but before mold separation, valve stems 110, 112 of the first part 102 and the second part 104, respectively, are moved axially and towards each other to shutoff the flow of molten material across the interface 108. Thereafter, the first and/or second parts 102, 104 are axially separated during mold separation for part ejection. To repeat the mold cavity filling operation, the first and/or second parts 102, 104 are brought into engagement by axially moving one or both of the two parts 102, 104 into engagement. The movement of the first part 102 or the second part 104, or both to the engagement position is not meant to be limiting; however, for explanation purposes, the embodiments shown in the figures will be described according to how they operate. In the embodiment shown in FIG. 2, the second part 104 is moved axially into engagement with the first part 102, and the valve stems 110, 112 are retracted or moved axially away from each other, thereby allowing the flow of molten material through the passageway 106 and across the interface 108.

Figure 2:
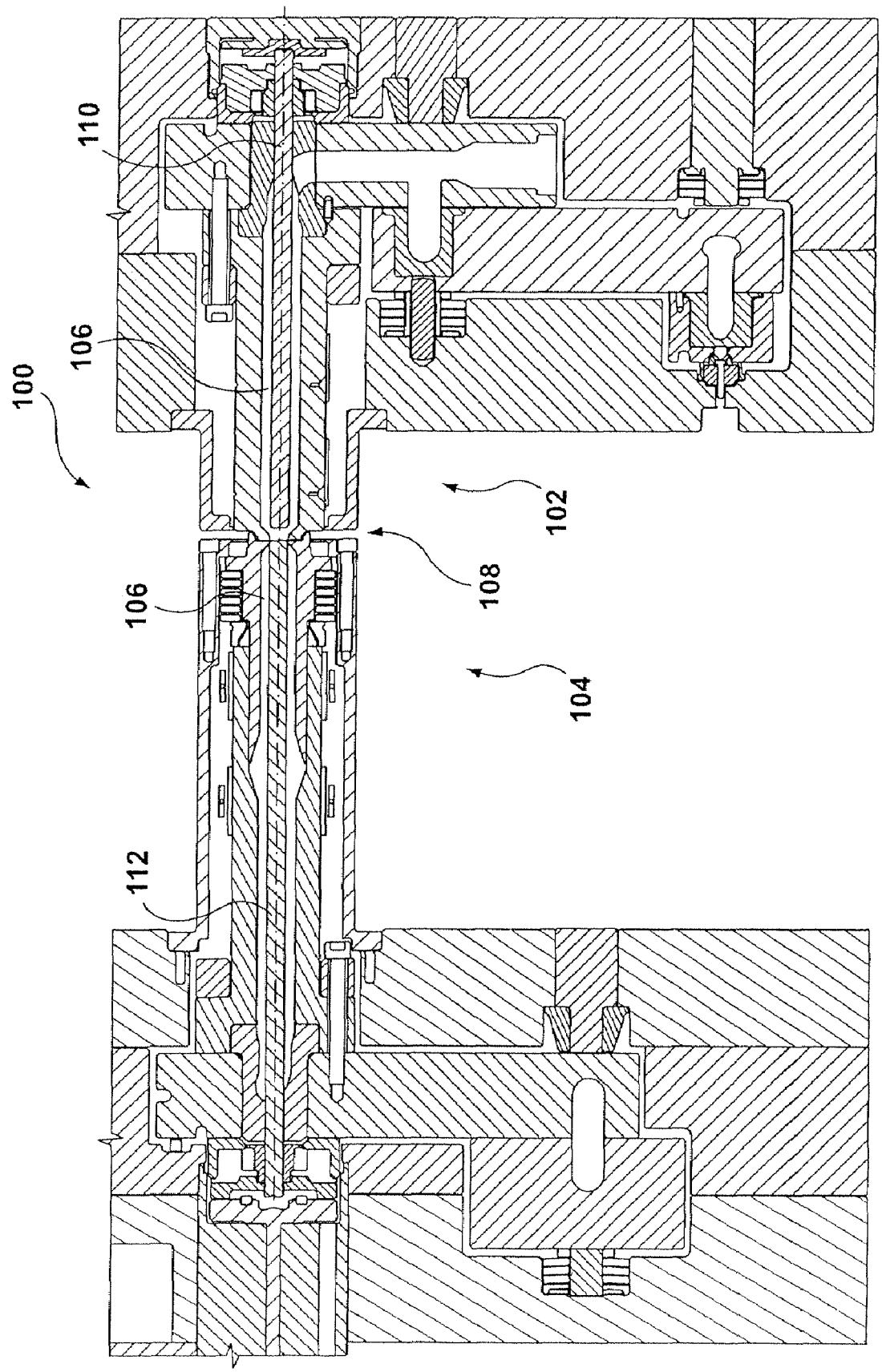
FIG. 2 is a cross-sectional view of a split sprue bar of a hot runner in engagement with each other and in accordance with the present invention.
Figure 3:
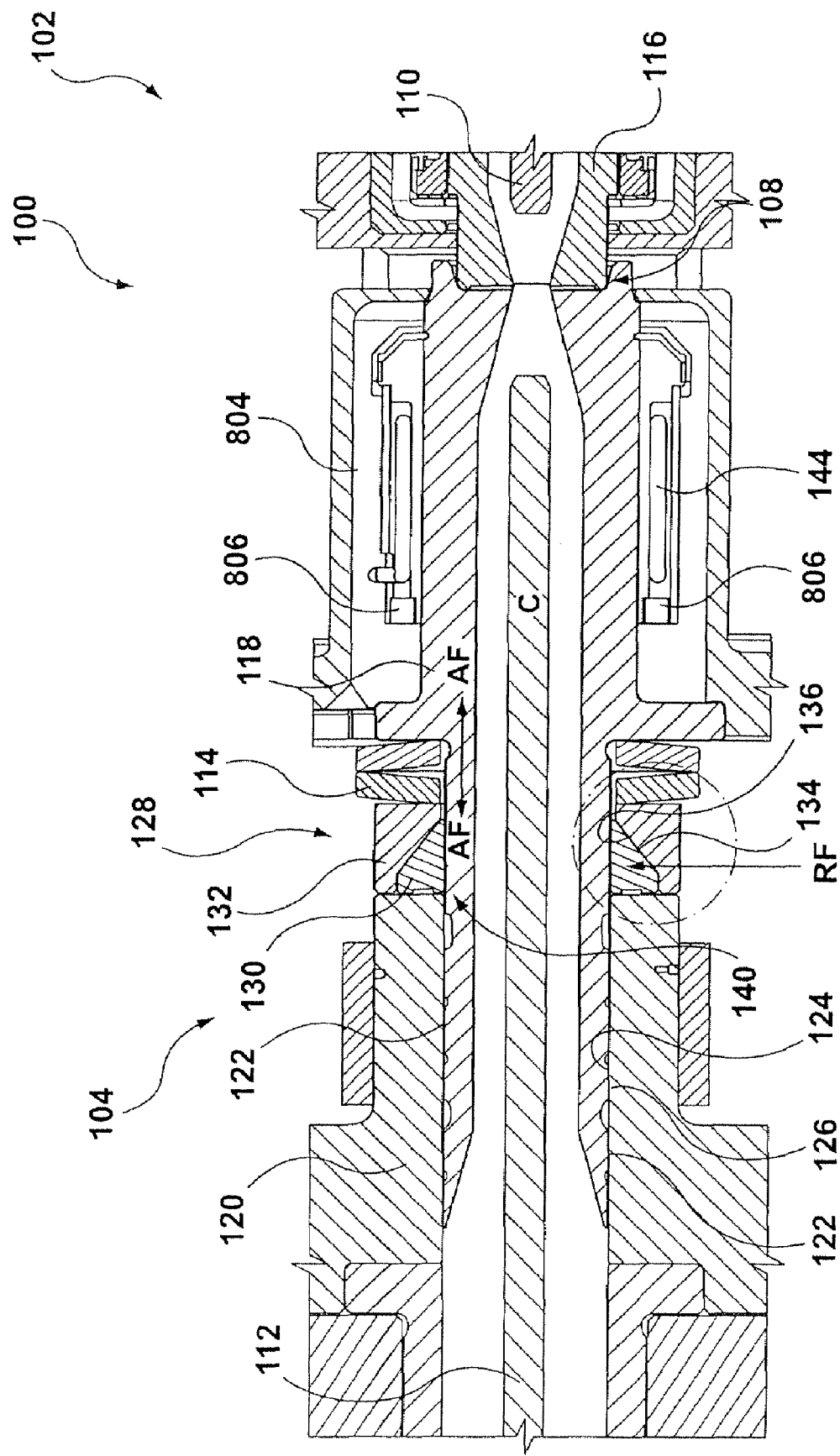
FIG. 3 is an enlarged partial cross-sectional view of a split sprue bar.

Referring now to FIG. 3 which shows a slight variation in design to that shown in FIG. 2, the split sprue bar 100 is shown in the engagement and mold filling positions. Springs or discs 114 (hereinafter "springs") are used to create an axial force AF between a nozzle 118 and a sprue 120. Specifically, the nozzle 118 is retained with the spare 120 by a cap 804, which is fastened to the sprue 120 with screws 806. The tightening of the screws 806 causes the springs 114 to partially compress when the mold is the open position so that the nozzle 118 is not loose. In alternative embodiments, the springs 114 may be replaced with a cylinder, bolt, or threads. The deflection of the springs 114 or initial pre-compression of the springs 114 creates the load or axial force AF. In addition, when the mold is closed and the two parts 102, 104 of the split sprue bar 100 are brought together, clamp and injection forces are applied causing a sealing force to be applied between The nozzle 118 and the sprue 120, thereby further compressing the springs 114 and increasing the AF. To accommodate this axial force AF, an outer surface 124 of the nozzle 118 slides or moves along an inner surface 126 of the sprue 120. In order to facilitate or allow the nozzle 118 to be in sliding engagement with the sprue 120, a clearance 122 is provided between the outer surface 124 of the nozzle 118 and the inner surface 126 of the sprue 120. The clearance 122 is not limited to an air gap between parts. The clearance 122 can include reduced forces between parts, wherein molten material may be forced through the clearance 122 due to the pressure of the molten material. To avoid leakage or weepage from exiting the clearance 122, a collar 128 is incorporated between a portion of the sprue 120 and a portion of the nozzle 118. The collar 128 is designed to receive the axial force AF and redirect at least a portion of the axial force AF to a radial force RF as will be explained in more detail hereinafter. This radial force RF acts on an inner portion 130 of the collar 128 forcing the inner portion 130 tightly into engagement with the nozzle 118, thereby sealing off the clearance 122 and/or an area 140 adjacent the clearance 122 where leakage or weepage may occur.

Figure 4B:
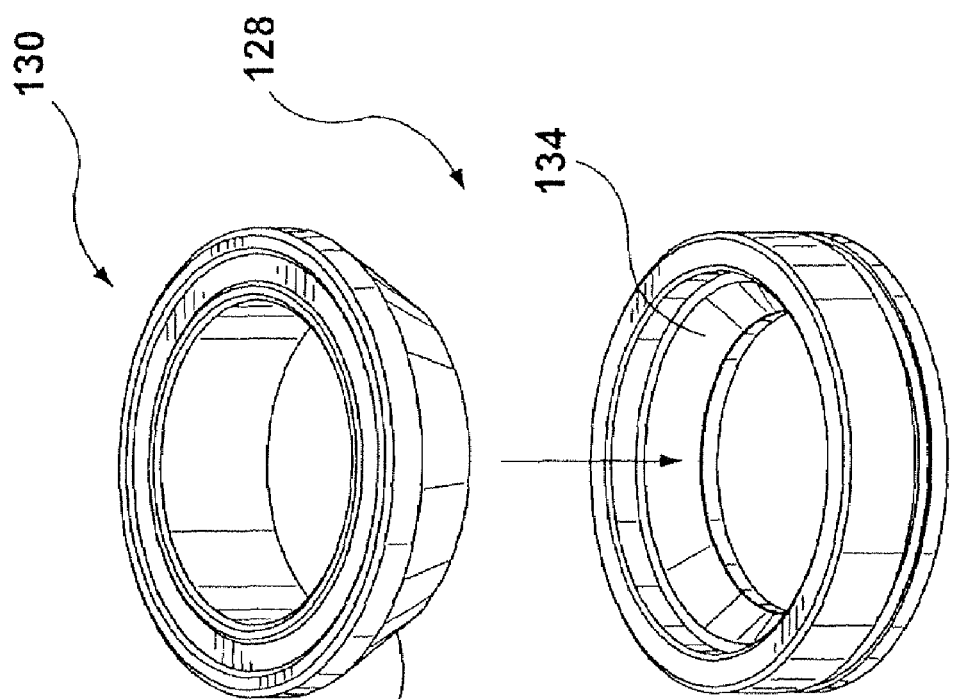
FIG. 4b is an exploded view and a perspective view of the collar shown in FIG. 4a and in accordance with the present invention.
Figure 4A:
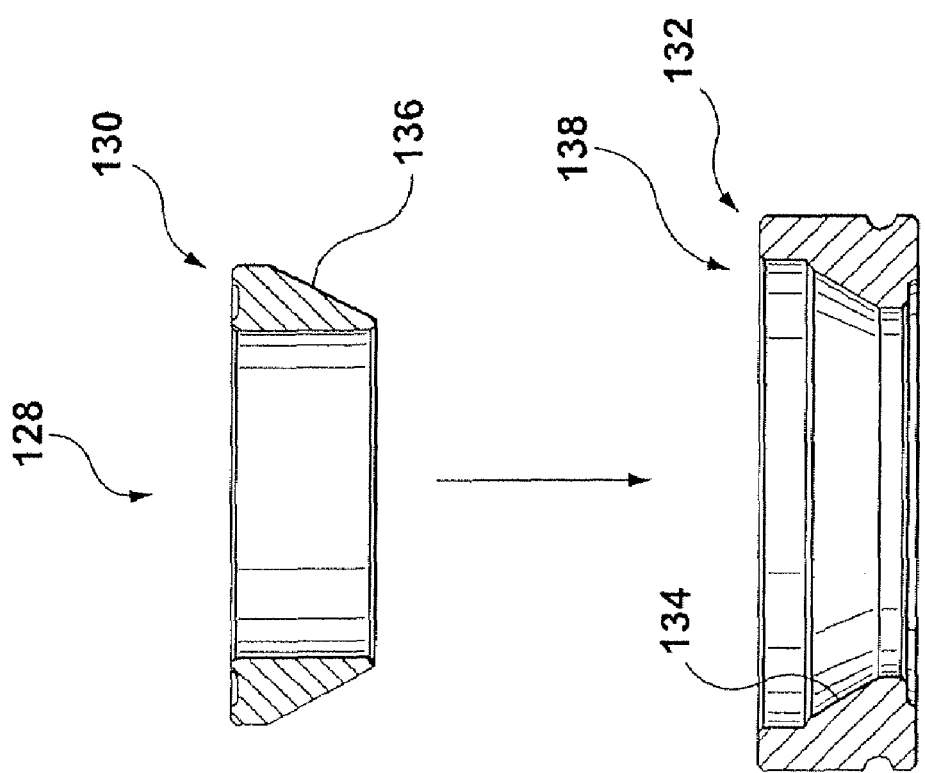
FIG. 4a is an enlarged partial cross-sectional view of a collar in a disassembled configuration according to the present invention.

Referring now to FIGS. 4a and 4b, the collar 128 has an outer portion 132 for receiving the inner portion 130. The outer portion 132 has a tapered surface 134 on its inside diameter. The inner portion 130 has a complementary tapered surface 136 on its outside diameter. In an alternative embodiment, only one of the tapered surfaces 134, 135 has a taper. Angles of the tapered surfaces 134, 136 are determined based on the diameter or size of the collar 128 and the force applied by the springs 114. In the embodiment shown in FIG. 3, the spring force was determined to be 8,000 pounds thus the outside diameter of the collar 128 was calculated to preferably be 65 millimeters and the angle of the tapered surfaces 134, 136 were calculated to preferably be 30 degrees from an axial centerline of thee collar 128. The inner portion 130 of the collar 128 is operatively assembled into a cavity 138 of the outer portion 132 of the collar 128, such that the tapered surface 136 of the inner portion 130 is slidably mounted to the tapered surface 134 of the outer portion 132. The collar 128 is operatively mounted around the outside diameter or circumference of the nozzle 118 and between the sprue 120 and springs 114.

In operation and with reference to FIG. 3, when the nozzle 118 of the second part 104 is brought into engagement with the nozzle 116 of the first part 102, the axial force AF created by the initial pre-compression of the springs 114 is increased. When the axial force AF, created by the pre-compression of the springs 114 and the engagement of the two parts 102, 104, is received by the outer portion 132, the outer portion 132 forces the inner portion 130 tightly into engagement with the nozzle 118 because of the tapered surfaces 134, 136 of the outer and inner portions 130, 132. As the tapered surface 134 of the outer portion 132 and the tapered surface 136 of the inner portion 130 are urged together, the outer portion 132 forces the inner portion 130 radially into the nozzle 118, thereby sealing off the area 140 adjacent the clearance 122 where leakage or weepage may occur.

Figure 5:
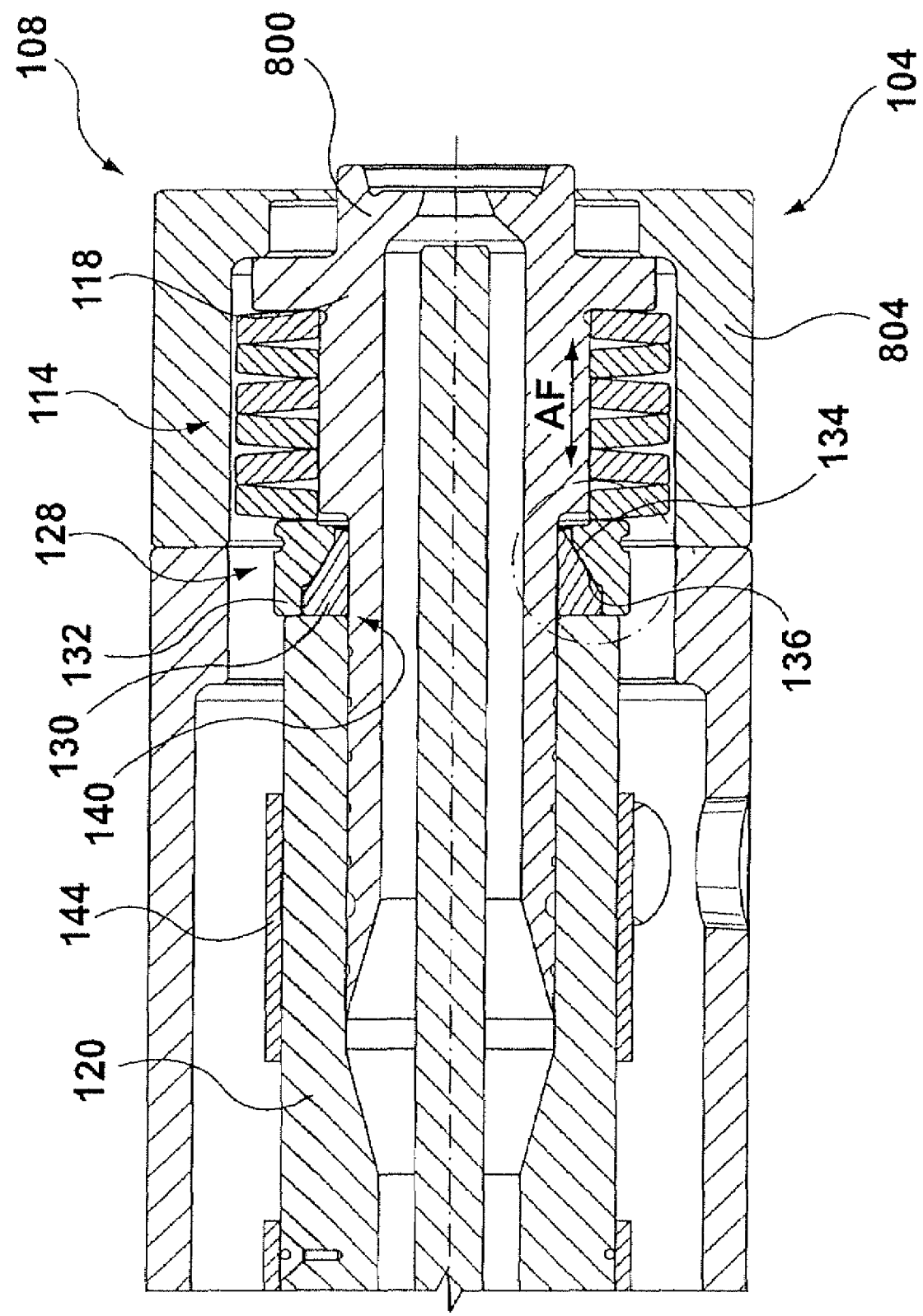
FIG. 5 is an enlarged partial cross-sectional view of a first alternative embodiment of the split sprue bar according to the present invention.

Referring now to FIG. 5 which illustrates a first alternative embodiment of the present invention. The second part 104 of the split sprue bar 100 is shown with the springs 114 operatively mounted between the collar 128 and a tip region 800. In this embodiment, additional springs are incorporated into the design and a heater 144 is in contact with the sprue 120 and not the nozzle 118. In this first alternative embodiment, the collar 128 operates as discussed above in relation to FIG. 3. The axial force AF, created by the springs 114 and the engagement of the second part 104 with the first part 102 of the split sprue bar 100, is received by the outer portion 132 of the collar 128. When the axial force AF is received by the outer portion 132, the outer portion 132 forces the inner portion 130 tightly into engagement with the nozzle 118 because of the tapered surfaces 134, 136 of the outer and inner portions 130, 132. As the tapered surface 134 of the outer portion 132 and the tapered surface 136 of the inner portion 130 are urged together, the outer portion 132 forces the inner portion 130 radially into the nozzle 118, thereby sealing off the area 140 adjacent the clearance 122 where leakage or weepage may occur.

Figure 6:
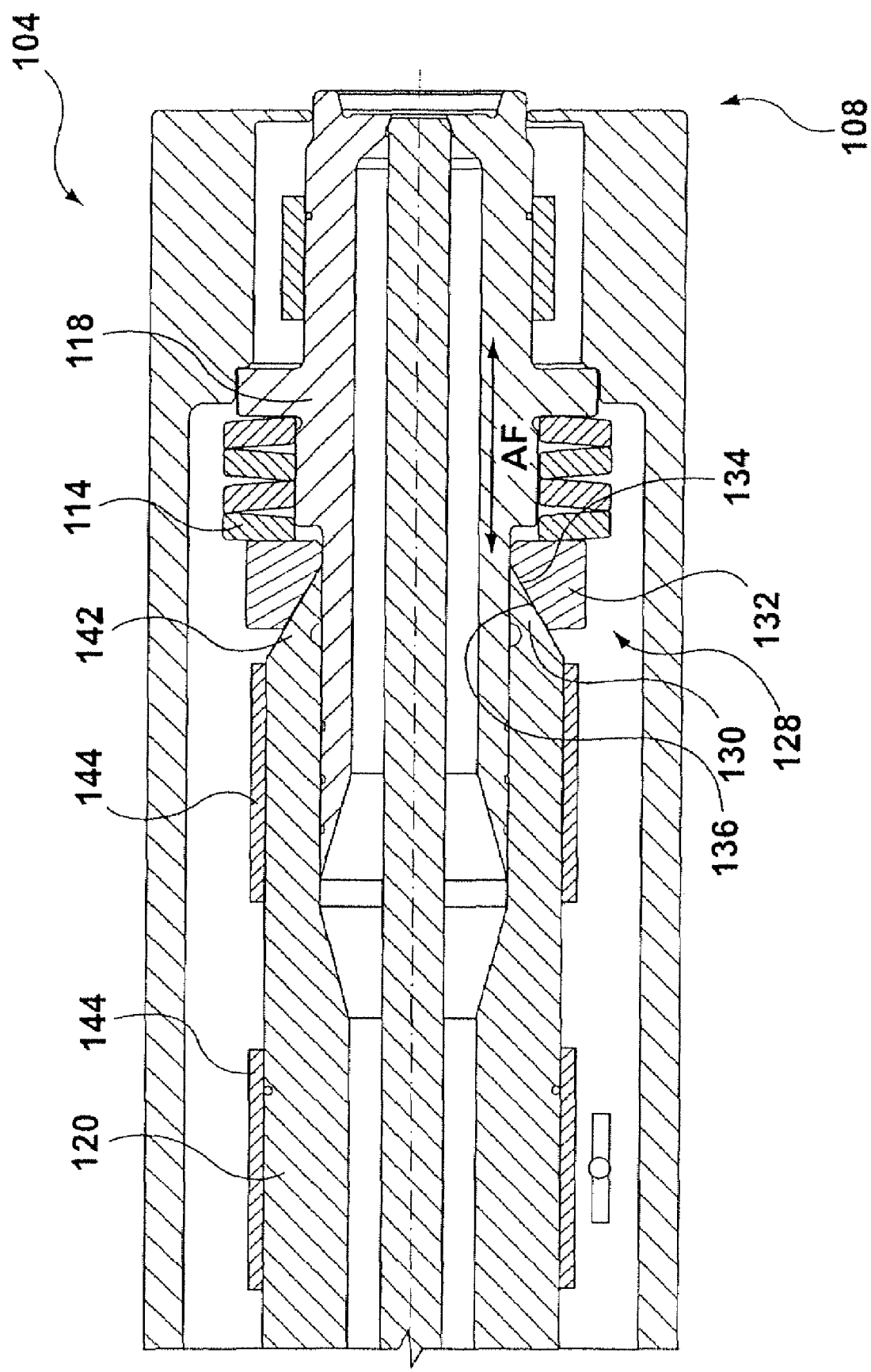
FIG. 6 is an enlarged partial cross-sectional view of a second alternative embodiment of the split sprue bar according to the present invention

Referring now to FIG. 6 which illustrates a second alternative embodiment of the present invention. In this embodiment, the inner portion 130 having the tapered surface 136 is modified such that the inner portion 130 having the tapered surface 136 is integral with or part of the sprue 120. In addition, additional springs are incorporated into the design and as compared with the design shown in FIG. 3. The axial force AF, created by the pre-compression of the springs 114 and the engagement of the second part 104 with the first part 102 of the split sprue bar 100, is received by the outer portion 132 of the collar 128. When the axial force AF is received by the outer portion 132, the outer portion 132 forces the inner portion 130 or a first end 142 of the sprue 120 tightly into engagement with the nozzle 118 because of the tapered surfaces 134, 136 of the outer portion 132 and the first end 142 of the sprue 120, which serves as the inner portion 130 in this embodiment. As the tapered surface 134 of the outer portion 132 and the tapered surface 136 of the inner portion 130 are urged together, the outer portion 132 forces the first end 142 of the sprue 120 radially into the nozzle 118, thereby sealing off the clearance 122 where leakage or weepage may occur.

Figure 7:
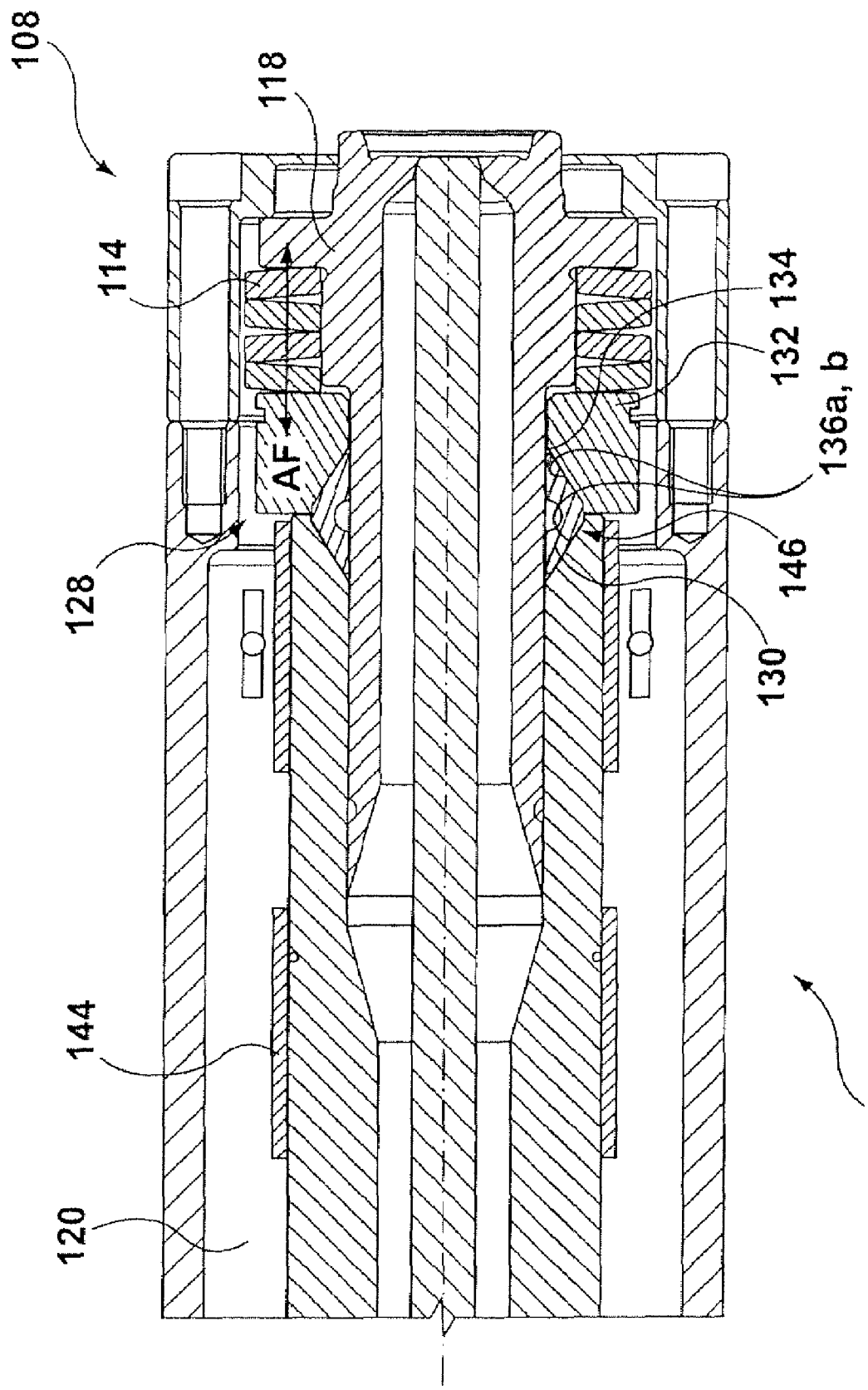
FIG. 7 is an enlarged partial cross-sectional view of a third alternative embodiment of the split sprue bar according to the present invention.

Referring now to FIG. 7 which illustrates a third alternative embodiment of the present invention. In this embodiment, the inner portion 130 has two tapered surfaces 136a, 136b, and one of the tapered surfaces 136a, 136b interfaces with the tapered surface 134 of the outer portion 132, and the other tapered surface 136a, 136b interfaces with a tapered end 146 of the sprue 120. In addition, additional springs are incorporated into the design and the heater 144 is in contact with the sprue 120 as compared to the design shown in FIG. 3. The axial force AF, created by the springs 114 and the engagement of the second part 104 with the first part 102 of the split sprue bar 100, is received by the springs 114 and the outer portion 132 of the collar 128. When the axial force AF is received by the outer portion 132, the outer portion 132 forces the inner portion 130 tightly into engagement between the nozzle 118 and the tapered end 146 of the sprue 120 because of the tapered surfaces 134, 136a, 136b of the outer portion 132 and the inner portion 130, and the tapered end 146 of the sprue 120. As the tapered surface 134 of the outer portion 132 and the tapered surface 136 of the inner portion 130 are urged together, the outer portion 132 forces the inner portion 130 between the nozzle 118 and the sprue 120, thereby sealing off the area 140 adjacent the clearance 122 where leakage or weepage may occur.

Figure 8:
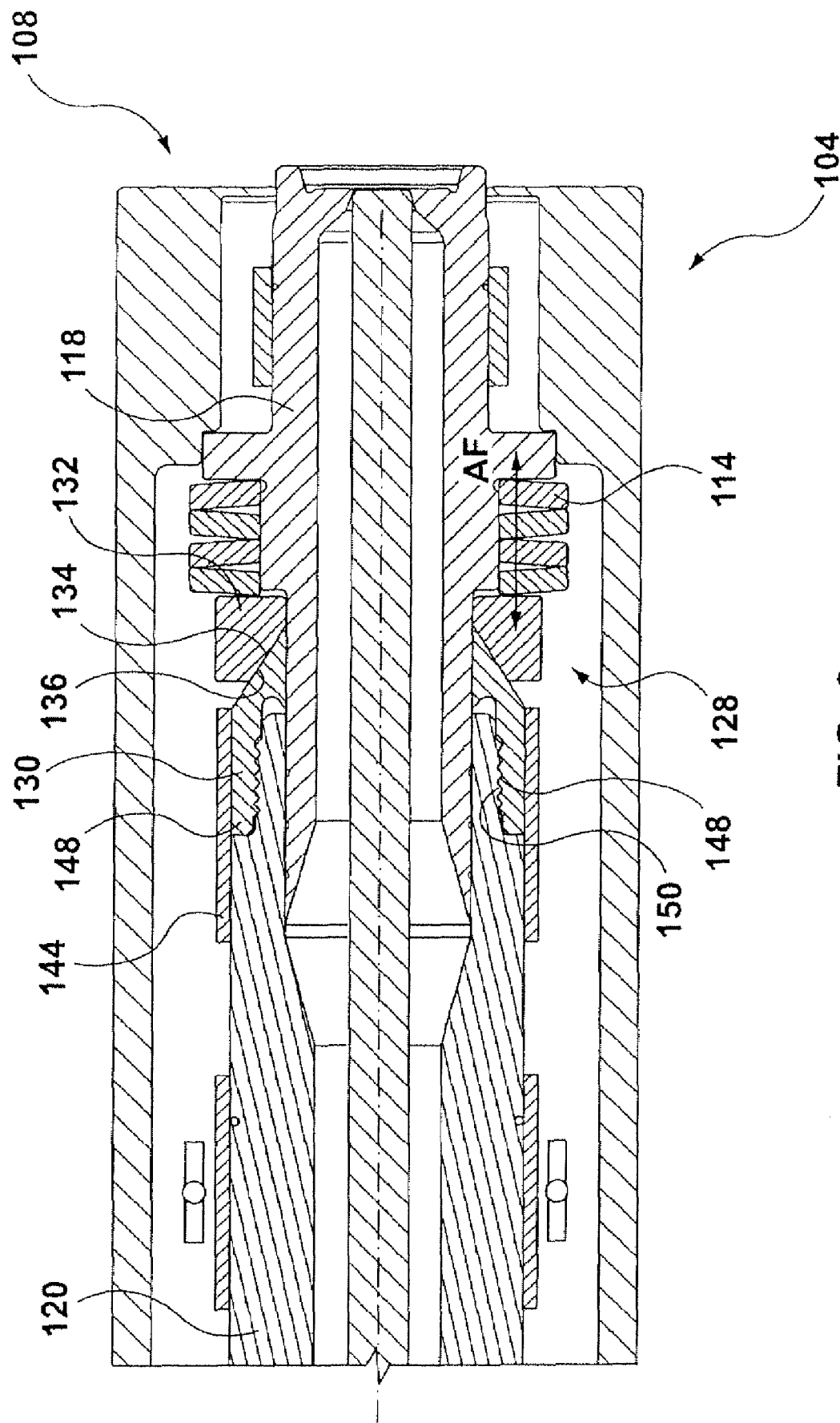
FIG. 8 is an enlarged partial cross-sectional view of a fourth alternative embodiment of the split sprue bar according to the present invention.

Referring now to FIG. 8 which illustrates a fourth alternative embodiment of the present invention. In this embodiment, the inner portion 130 having the tapered surface 136 has a threaded portion 148 that threads to mating threads 150 on the sprue 120. This design allows for efficient replacement of the inner portion 130. The axial force AF, created by the springs 114 and the engagement of the second part 104 with the first part 102 of the split sprue bar 100, is received by the outer portion 132 of the collar 128. When the axial force AF is received by the outer portion 132, the outer portion 132 forces the inner portion 130 tightly into engagement with the nozzle 118 because of the tapered surfaces 134, 136 of the outer portion 132 and the inner portion 130. As the tapered surface 134 of the outer portion 132 and the tapered surface 136 of the inner portion 130 are urged together, the outer portion 132 forces the inner portion 130 radially into the nozzle 118, thereby sealing off the area 140 adjacent the clearance 122 where leakage or weepage may occur.

Figure 9:
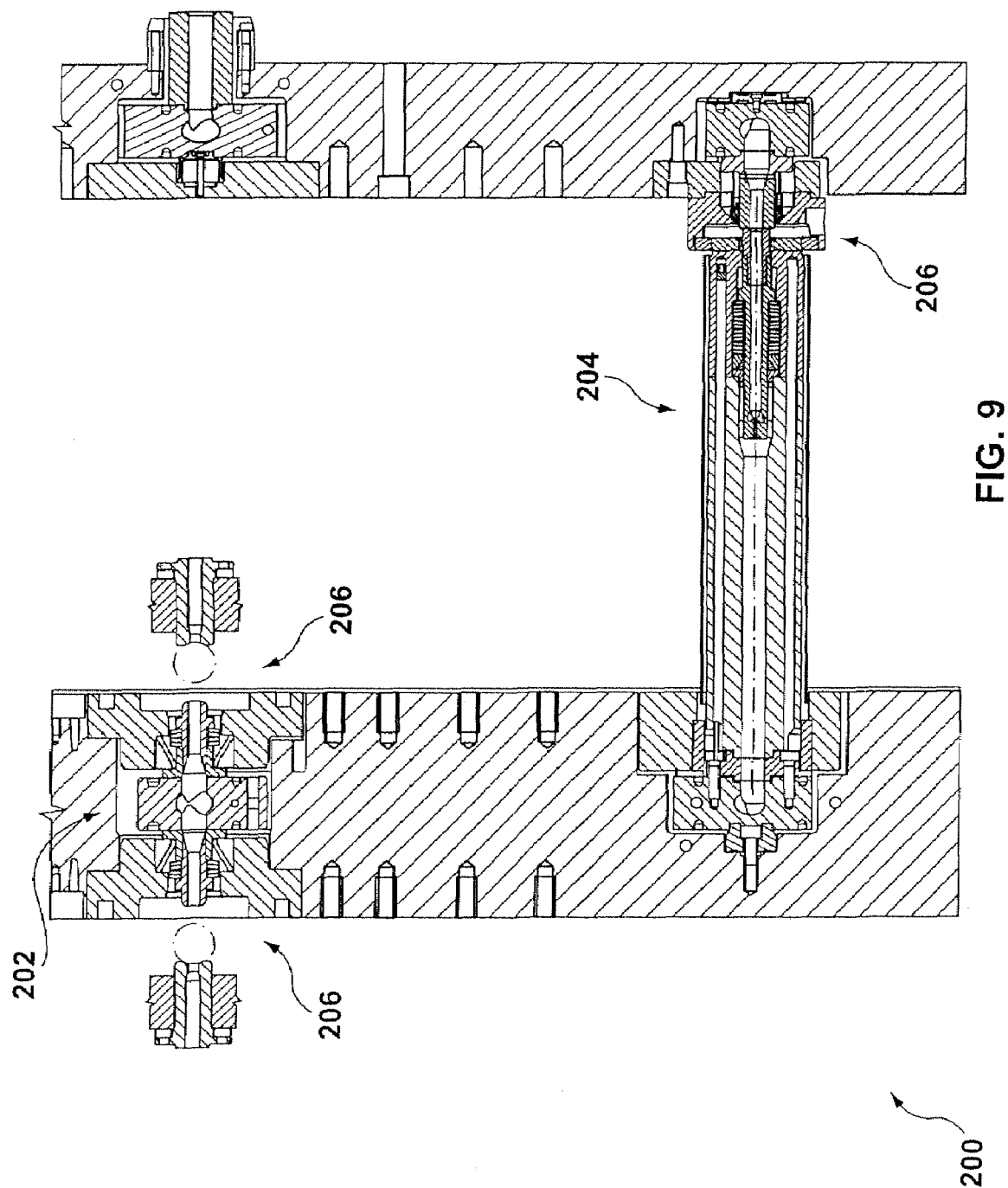
FIG. 9 is a partial cross-sectional view of an offset stack platen.

Referring now to FIG. 9, an offset stack platen 200 is shown without the collar 128 incorporated therein. The general operation and design of the offset stack platen 200 is generally known and no further explanation is required for those having ordinary skill in the art. The offset stack platen 200 has a stack platen assembly 202 and offset stack sprue bar 204. Similar to the split sprue bar 100, the offset stack platen 200 is designed to transfer molten material across at least one interface 206 during mold cavity loading or filling while also being capable of separating into sections to allow mold separation during mold opening.

Figure 10:
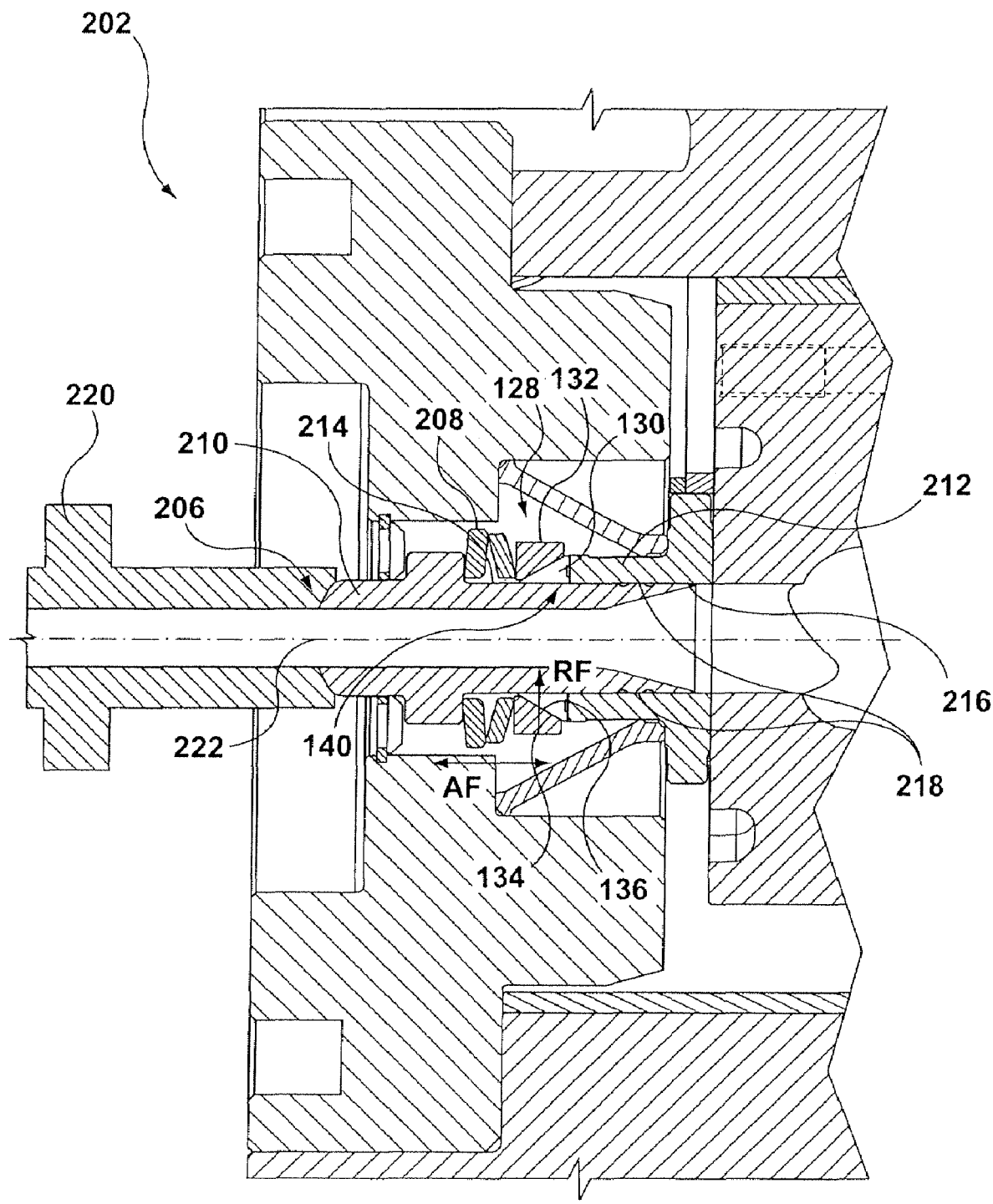
FIG. 10 is a partial cross-sectional view of a stack platen assembly of FIG. 9 but in accordance with the present invention.

Referring now to FIG. 10 which illustrates a portion of the stack platen assembly 202 in accordance with the present invention. The stack platen assembly 202 is engaged by a sprue bushing manifold 220 defining a passageway 222 across at at least one interface 206. The stack platen assembly 202 is symmetrical thus only a left side of the stack platen assembly 202 is shown for clarity; however, the present invention may also be incorporated into a right side of the stack platen assembly 202. Springs or discs 208 (hereinafter "springs") are used to create an axial force AF between a nozzle 210 and a nozzle bushing 212. In alternative embodiments, the springs 208 may be replaced with a cylinder, bolt, or threads. The deflection of the springs 208 creates the load or axial force AF. To accommodate this axial force AF, an outer surface 214 of the nozzle 210 slides or moves along an inner surface 216 of the nozzle bushing 212. In order to facilitate or allow the nozzle 210 to be in sliding engagement with the nozzle bushing 212, a clearance 218 is provided between the outer surface 214 of the nozzle 210 and the inner surface 216 of the nozzle bushing 212. To avoid leakage or weepage from exiting the clearance 218, the collar 128 is incorporated between a portion of the nozzle bushing 212 and a portion of the nozzle 210. The collar 128 is designed to receive the axial force AF and redirect at least a portion of the axial force AF to a radial force RF as was explained in detail with regard to the split sprue bar 100. This radial force RF acts on an inner portion 130 of the collar 128 forcing the inner portion 130 tightly into engagement with the nozzle 210, thereby sealing off an area 140 adjacent the clearance 218 where leakage or weepage may occur. Specifically, when the axial force AF created by the springs 208 and the axial force AF created from engagement of the sprue bushing manifold 220 and the stack platen assembly 202 are received by the outer portion 132 of the collar 128, the outer portion 132 forces the inner portion 130 tightly into engagement with the nozzle 210 because of the tapered surfaces 134, 136 of the outer and inner portions 130, 132. As the tapered surface 134 of the outer portion 132 and the tapered surface 136 of the inner portion 130 are urged together, the outer portion 132 forces the inner portion 130 radially into the nozzle 210, thereby sealing off the area 140 adjacent the clearance 218 where leakage or weepage may occur.

Figure 11:
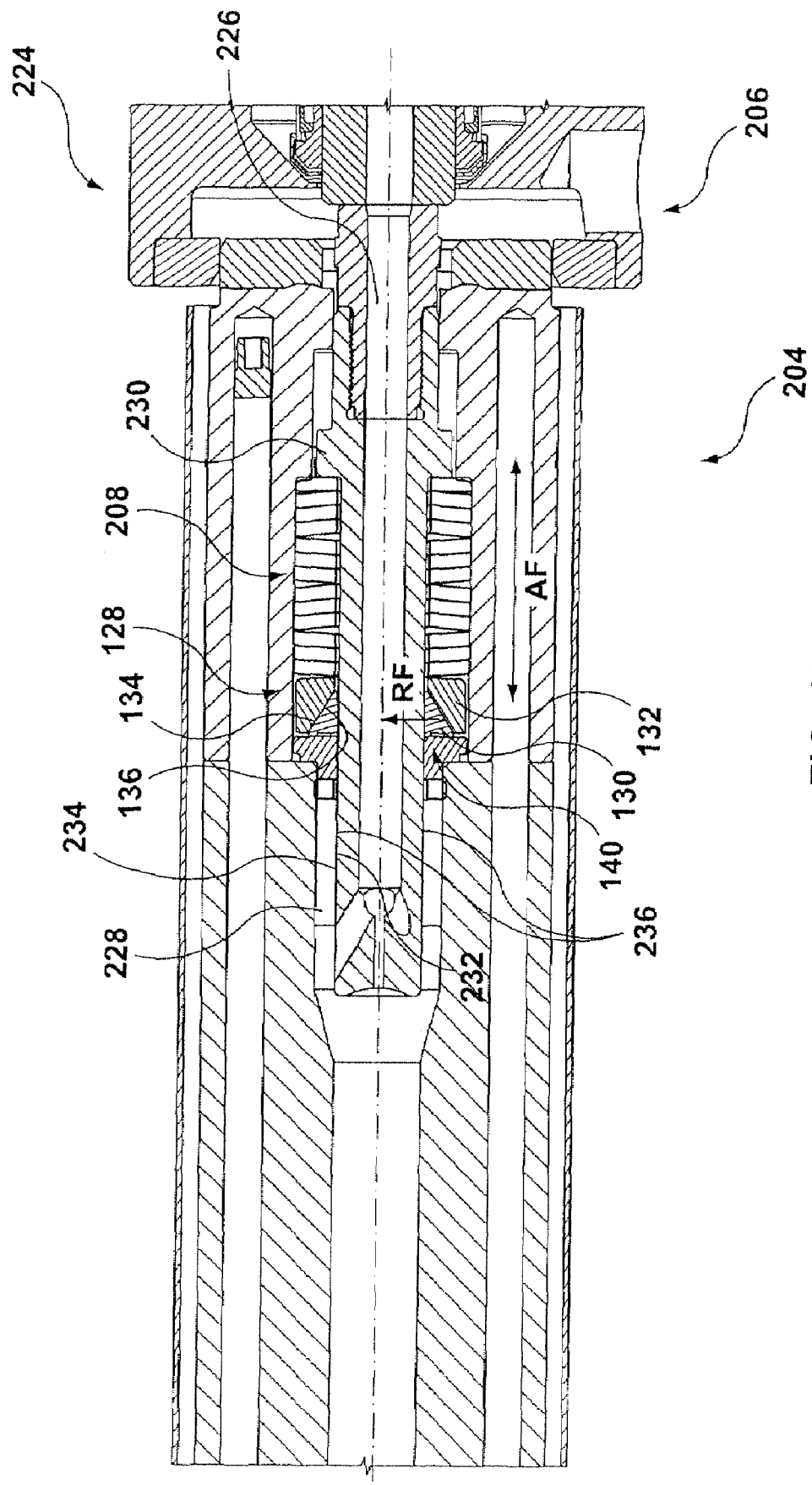
FIG. 11 is a cross-sectional view of an offset stack sprue bar of FIG. 9 but in accordance with the present invention.

Referring now to FIG. 11 which illustrates the offset stack sprue bar 204 in accordance with the present invention. The offset stack sprue bar 204 engages a sprue bushing 224 defining a passageway 226 across at at least one interface 206 during loading or filling of the mold cavity as is shown in FIG. 11 and axially separates from the sprue bushing 224 during mold separation for part ejection. The springs 208 are used to create an axial force AF between a nozzle 230 and a bushing 228. The deflection of the springs 208 creates the load or axial force AF. To accommodate this axial force AF, an outer surface 232 of the nozzle 230 slides or moves along an inner surface 234 of the bushing 228. In order to facilitate or allow the nozzle 230 to be in sliding engagement with the bushing 228, a clearance 236 is provided between the outer surface 232 of the nozzle 230 and the inner surface 234 of the bushing 228. To avoid leakage or weepage from exiting the clearance 236, the collar 128 is incorporated between a portion of the bushing 228 and a portion of the nozzle 230. The collar 128 is designed to receive the axial force AF and redirect at least a portion of the axial force AF to a radial force RF as was previously explained in detail. This radial force RF acts on an inner portion 130 of the collar 128 forcing the inner portion 130 tightly into engagement with the nozzle 230, thereby sealing off an area 140 adjacent the clearance 236 where leakage or weepage may occur. Specifically, when the axial force AF created by the springs 208 and the axial force AF created from engagement of the sprue bushing 224 and the offset stack sprue bar 204 are received by the outer portion 132 of the collar 128, the outer portion 132 forces the inner portion 130 tightly into engagement with the nozzle 230 because of the tapered surfaces 134, 136 of the outer and inner portions 130, 132. As the tapered surface 134 of the outer portion 132 and the tapered surface 136 of the inner portion 130 are urged together, the outer portion 132 forces the inner portion 130 radially into the nozzle 230, thereby sealing off the area 140 adjacent the clearance 236 where leakage or weepage may occur.

Figure 12:
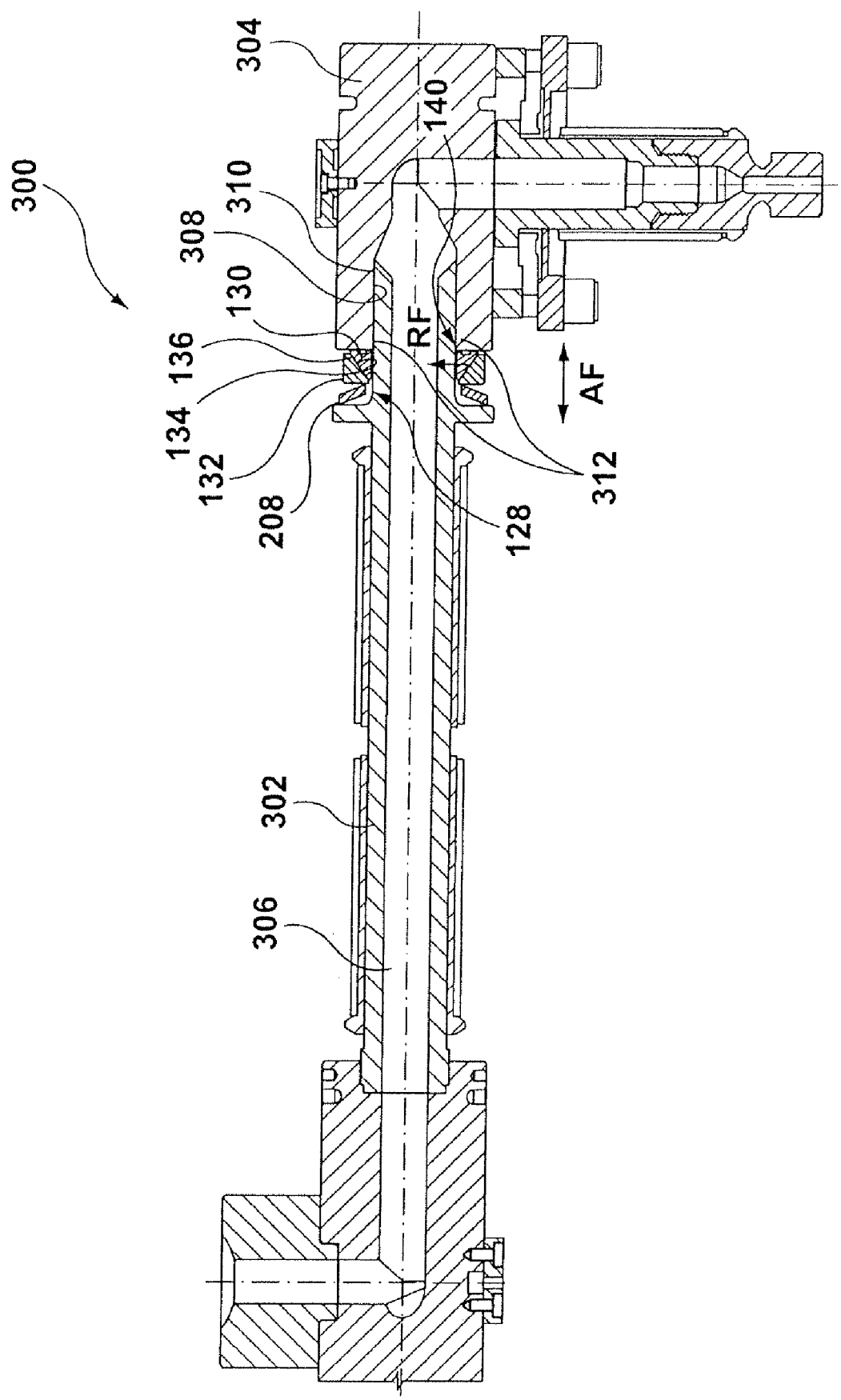
FIG. 12 is a cross-sectional view of a telescoping manifold in accordance with the present invention.

Referring now to FIG. 12 which illustrates a telescoping manifold assembly 300 in accordance with the present invention. The telescoping manifold assembly 300 includes a tubular manifold 302 slidably received by a drop manifold 304. A passageway 306 for receiving molten material runs through the tubular manifold 302 and to the drop manifold 304 and also redirects the molten material therefrom. The springs 208 are used to create an axial force AF between the tubular manifold 302 and the drop manifold 304. The deflection of the springs 208 creates the load or axial force AF. To accommodate this axial force AF, an outer surface 308 of the tubular manifold 302 slides or moves along an inner surface 310 of the drop manifold 304. In order to facilitate or allow the tubular manifold 302 to be in sliding engagement with the drop manifold 304, a clearance 312 is provided between the outer surface 308 of the tubular manifold 302 and the inner surface 310 of the drop manifold 304. To avoid leakage or weepage from exiting the clearance 312, the collar 128 is incorporated between at least a portion of the tubular manifold 302 and at least a portion of the drop manifold 304. The collar 128 is designed to receive the axial force AF and redirect at least a portion of the axial force AF to a radial force RF as was explained in detail previously. This radial force RF acts on an inner portion 130 of the collar 128 forcing the inner portion 130 tightly into engagement with the tubular manifold 302, thereby sealing off an area 140 adjacent the clearance 312 where leakage or weepage may occur. Specifically, when the axial force AF created by the springs 208 is received by the outer portion 132 of the collar 128, the outer portion 132 forces the inner portion 130 tightly into engagement with the tubular manifold 302 because of the tapered surfaces 134, 136 of the outer and inner portions 130, 132. As the tapered surface 134 of the outer portion 132 and the tapered surface 136 of the inner portion 130 are urged together, the outer portion 132 forces the inner portion 130 radially into the tubular manifold 302, thereby sealing off the area 140 adjacent the clearance 312 where leakage or weepage may occur.

Figure 13:
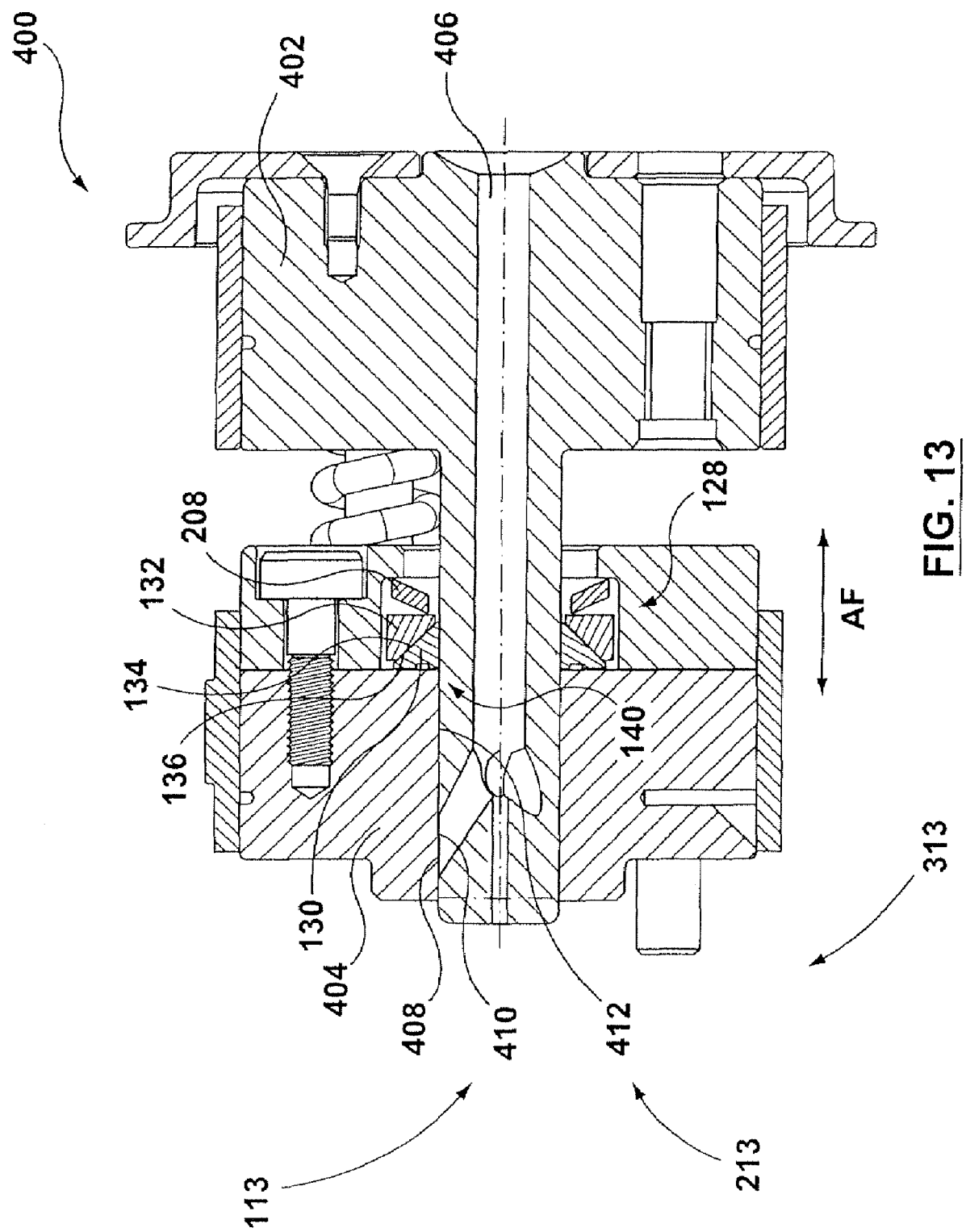
FIG. 13 is a cross-sectional view of an anti-drool apparatus in accordance with the present invention.

Referring now to FIG. 13 which illustrates an anti-drool apparatus 400 in accordance with the present invention. The anti-drool apparatus 400 includes a nozzle 402 slidably received by a bushing 404. A passageway 406 runs axially through the nozzle 402 and the bushing 404. The springs 208 are used to create an axial force AF between the nozzle 402 and the bushing 404. The deflection of the springs 208 creates the load or axial force AF. To accommodate this axial force AF, an outer surface 408 of the nozzle 402 slides or moves along an inner surface 410 of the bushing 404. In order to facilitate or allow the nozzle 402 to be in sliding engagement with the bushing 404, a clearance 412 is provided between the outer surface 408 of the nozzle 402 and the inner surface 410 of the bushing 404. To avoid leakage or weepage from exiting the clearance 412, the collar 128 is incorporated between at least a portion of the nozzle 402 and at least a portion of the bushing 404. The collar 128 is designed to receive the axial force AF and redirect at least a portion of the axial force AF to a radial force RF as was explained in detail previously. This radial force RF acts on an inner portion 130 of the collar 128 forcing the inner portion 130 tightly into engagement with the nozzle 402, thereby sealing off an area 140 adjacent the clearance 412 where leakage or weepage may occur. Specifically, when the axial force AF created by the springs 208 is received by the outer portion 132 of the collar 128, the outer portion 132 forces the inner portion 130 tightly into engagement with the nozzle 402 because of the tapered surfaces 134, 136 of the outer and inner portions 130, 132. As the tapered surface 134 of the outer portion 132 and the tapered surface 136 of the inner portion 130 are urged together, the outer portion 132 forces the inner portion 130 radially into the nozzle 402, thereby sealing off the area 140 adjacent the clearance 412 where leakage or weepage may occur.

Figure 14:
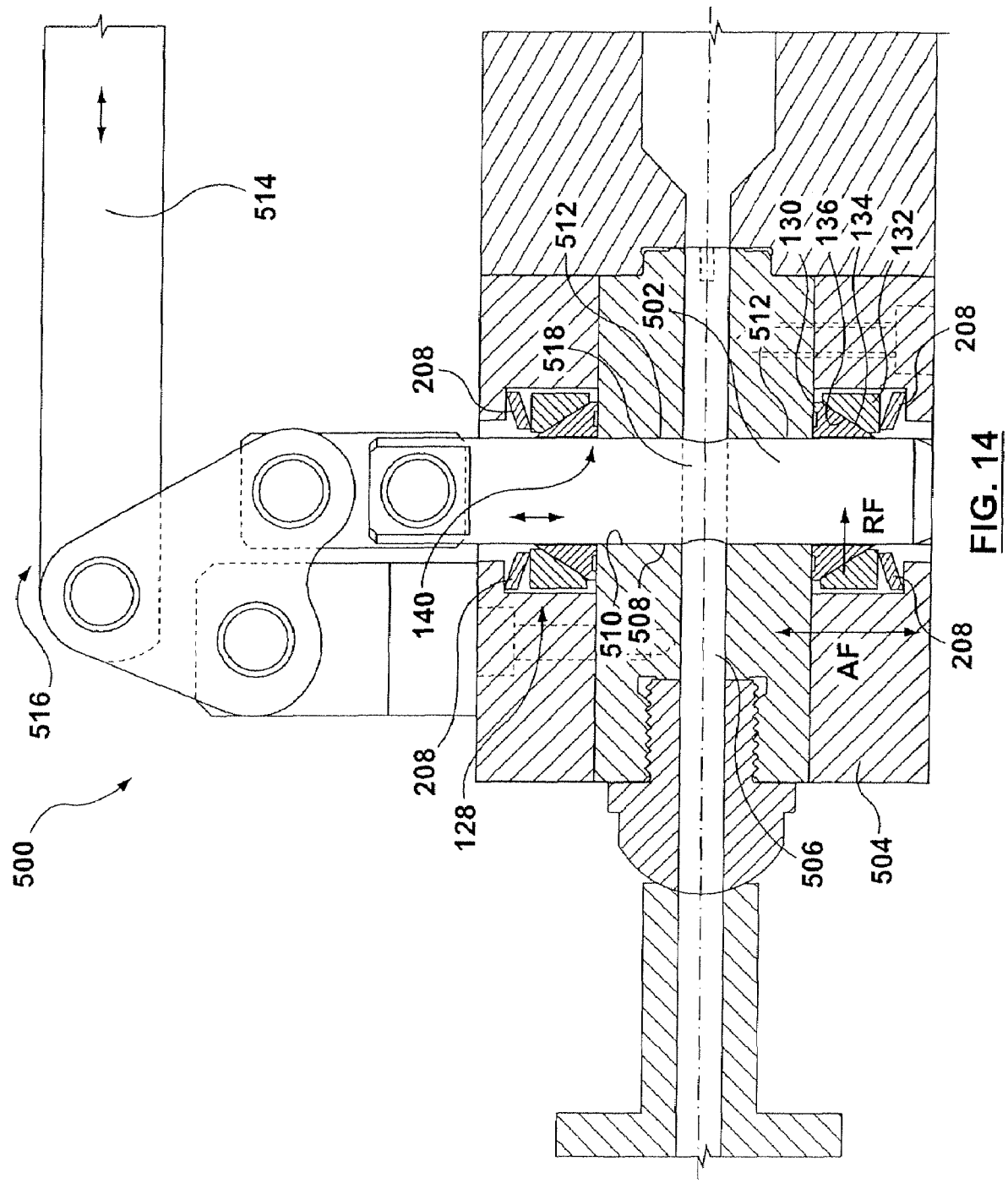
FIG. 14 is a cross-sectional view of a linear shut-off apparatus in accordance with the present invention.

Referring now to FIG. 14 which illustrates a linear shut-off apparatus 500 in accordance with the present invention. The linear shut-off apparatus 500 has a rod 514 for moving a pin 502 via a hinge pin and bracket assembly 516. The pin 502 has a bore 518 through it perpendicular to its longitudinal axis for allowing molten material to pass therethrough as is shown in FIG. 14. The pin 502 is slidably received by a shut-off assembly 504. A passageway 506 in the shut-off assembly 504 runs axially to the bore 518 in the opened or fill position as is shown in FIG. 14 to allow molten material to pass through the passageway 506 and the bore 518 when the passageway 506 and the bore 518 are in axial alignment. However, when the rod 514 is moved, it moves pin 502 via the hinge pin and bracket assembly 516 to cause the bore 518 to move out of axial alignment with the passageway 506, and the pin 502 blocks the molten material from passing through because the bore 518 is not in axial alignment with the passageway 506. As can be appreciated, the rod 514 moves back-and-forth moving the bore 518 into and out of axial alignment with the passageway 506. This allows and precludes molten material from passing. In order to facilitate or allow the pin 502 to be in sliding engagement with the shut-off assembly 504, a clearance 512 is provided between the outer surface 508 of the pin 502 and the inner surface 510 of the shut-off assembly 504. To avoid leakage or weepage from exiting the clearance 512, the collar 128 is incorporated between a portion of the pin 502 and a portion of the shut-off assembly 504. The springs 208 are used to create an axial force AF on the collar 128. The deflection of the springs 208 creates the load or axial force AF. The collar 128 is designed to receive the axial force AF and redirect at least a portion of the axial force AF to a radial force RF as was explained in detail previously. This radial force RF acts on an inner portion 130 of the collar 128 forcing the inner portion 130 tightly into engagement with the pin 502, thereby sealing off an area 140 adjacent the clearance 512 where leakage or weepage may occur. Specifically, when the axial force AF created by the springs 208 is received by the outer portion 132 of the collar 128, the outer portion 132 forces the inner portion 130 tightly into engagement with the pin 502 because of the tapered surfaces 134, 136 of the outer and inner portions 130, 132. As the tapered surface 134 of the outer portion 132 and the tapered surface 136 of the inner portion 130 are urged together, the outer portion 132 forces the inner portion 130 radially into the pin 502, thereby sealing off the area 140 adjacent the clearance 512 where leakage or weepage may occur.

Figure 15:
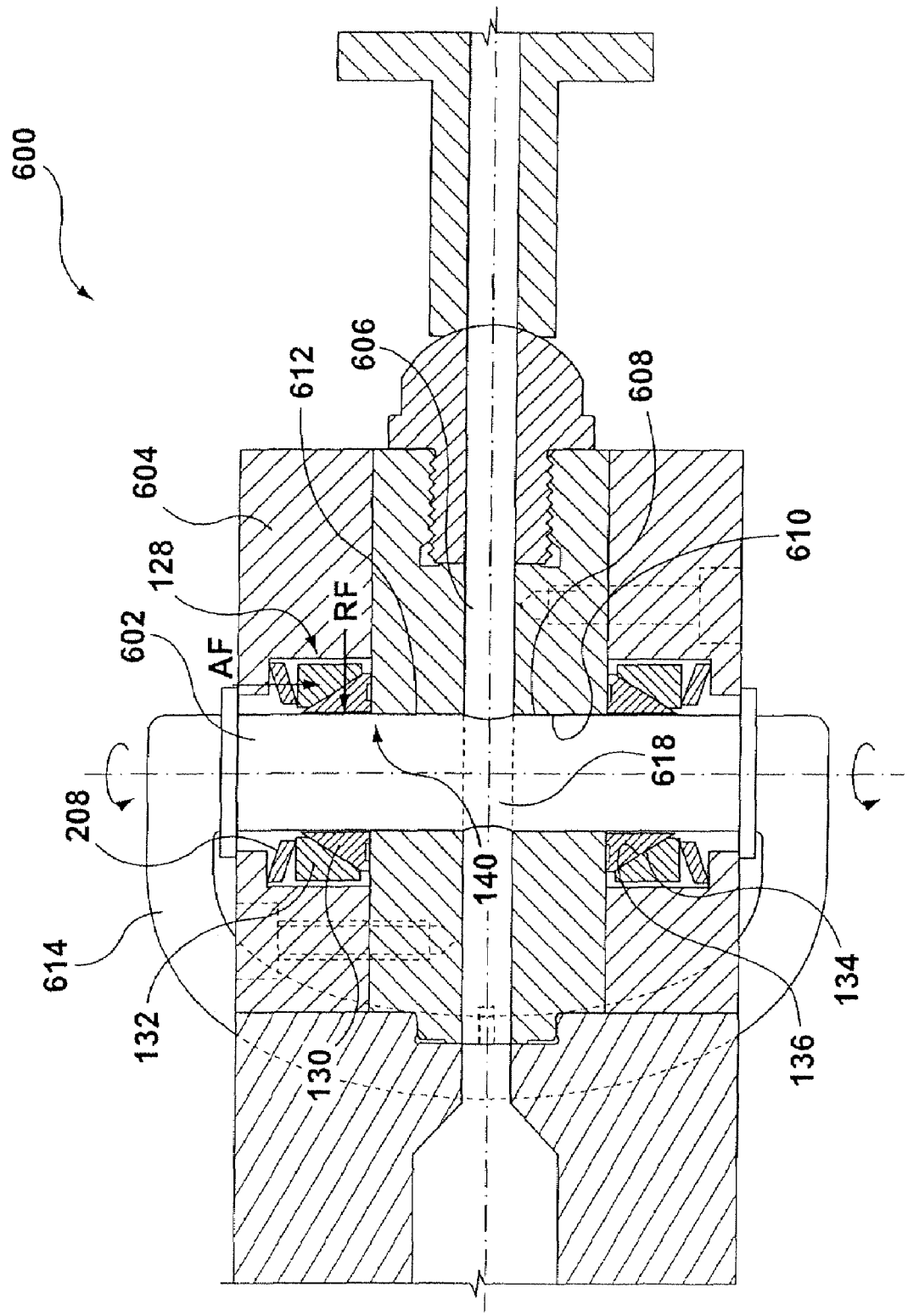
FIG. 15 is a cross-sectional view of a rotary shut-off apparatus in accordance with the present invention.

Referring now to FIG. 15 which illustrates a rotary shut-off apparatus 600 in accordance with the present invention. The rotary shut-off apparatus 600 has a rotational bracket 614 for moving or rotating a pin 602. The pin 602 has a bore 618 through it perpendicular to its longitudinal axis for allowing molten material to pass therethrough as is shown in FIG. 15. The pin 602 is rotatably received by a shut-off assembly 604. A passageway 606 of the shut-off assembly 604 runs axially to the bore 618 in an opened or fill position as is shown in FIG. 15 to allow molten material to pass through the passageway 606 and the bore 618 when the passageway 606 and the bore 618 are in axial alignment. However, when the rotational bracket 614 is pivoted, the bore 618 is rotated out of axial alignment with the passageway 606, and the pin 602 blocks the molten material from passing. As can be appreciated, the rotational bracket 614 pivots back-and-forth moving the bore 618 into and out of axial alignment with the passageway 606. This allows and precludes molten material from passing through the bore 618. In order to facilitate or allow the pin 602 to be in rotational engagement with the shut-off assembly 604, a clearance 612 is provided between the outer surface 608 of the pin 602 and the inner surface 610 of the shut-off assembly 604. To avoid leakage or weepage from exiting the clearance 612, the collar 128 is incorporated between at least a portion of the pin 602 and at least a portion of the shut-off assembly 604. The springs 208 are used to create an axial force AF on the collar 128. The deflection of the springs 208 creates the load or axial force AF. The collar 128 is designed to receive the axial force AF and redirect at least a portion of the axial force AF to a radial force RF as was explained in detail previously. This radial force RF acts on an inner portion 130 of the collar 128 forcing the inner portion 130 tightly into engagement with the pin 602, thereby sealing off an area 140 adjacent the clearance 612 where leakage or weepage may occur. Specifically, when the axial force AF created by the springs 208 is received by the outer portion 132 of the collar 128, the outer portion 132 forces the inner portion 130 tightly into engagement with the pin 602 because of the tapered surfaces 134, 136 of the outer and inner portions 130, 132. As the tapered surface 134 of the outer portion 132 and the tapered surface 136 of the inner portion 130 are urged together, the outer portion 132 forces the inner portion 130 radially into the pin 602, thereby sealing off the area 140 adjacent the clearance 612 where leakage or weepage may occur.

Figure 16:
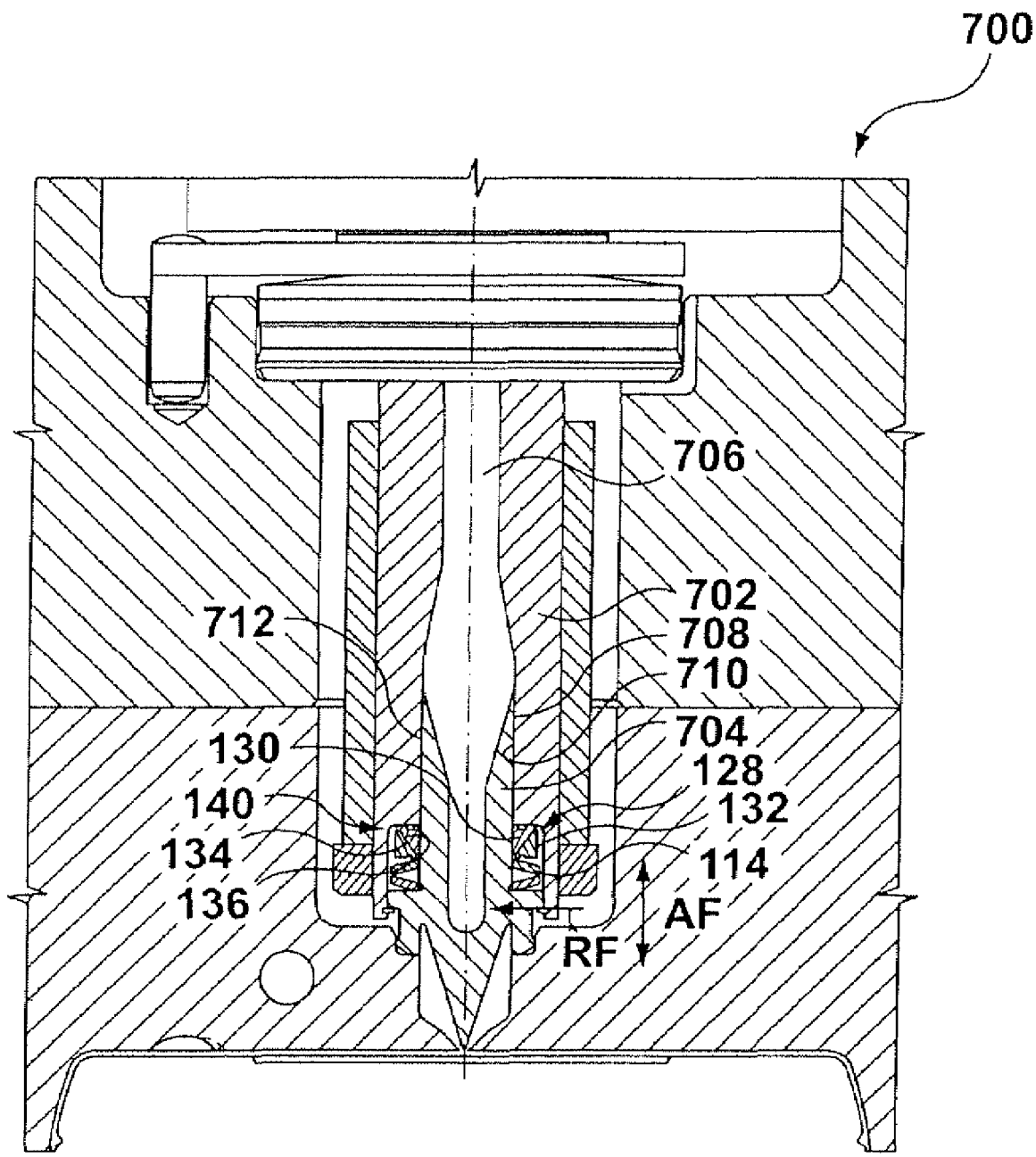
FIG. 16 is a cross-sectional view of a nozzle assembly in accordance with the present invention.

Referring now to FIG. 16 which illustrates a nozzle assembly 700 for a hot runner system (not shown) in accordance with the present invention. The nozzle assembly 700 has a nozzle 702 and a tip 704 coaxially arranged. Springs are used to create an axial force AF between the nozzle 702 and the tip 704. The nozzle 702 and the tip 704 are slidably mounted to each other. The deflection of the springs 114 creates the load or axial force AF. An outer surface 708 of the nozzle 702 slides or moves along an inner surface 710 of the tip 704. In order to facilitate or allow the nozzle 702 to be in sliding engagement with the tip 704, a clearance 712 is provided between the outer surface 708 of the nozzle 702 and the inner surface 710 of the tip 704. To avoid leakage or weepage from exiting the clearance 712, a collar 128 is incorporated between at least a portion of the tip 704 and at least a portion of the nozzle 702. The collar 128 is designed to receive the axial force AF and redirect at least a portion of the axial force AF to a radial force RF as has been explained previously. This radial force RF acts on the inner portion 710 of the collar 128 forcing the inner portion 710 tightly into engagement with the nozzle 702, thereby sealing off the clearance 712 or an area 140 adjacent the clearance 712 where leakage or weepage may occur. Specifically, when the axial force AF created by the springs 114 is received by the outer portion 132 of the collar 128, the outer portion 132 forces the inner portion 130 tightly into engagement with the tip 704 because of the tapered surfaces 134, 136 of the outer and inner portions 130, 132. As the tapered surface 134 of the outer portion 132 and the tapered surface 136 of the inner portion 130 are urged together, the outer portion 132 forces the inner portion 130 radially into the tip 704, thereby sealing off the clearance 712 or the area 140 adjacent the clearance 712 where leakage or weepage may occur.

Figure 17:
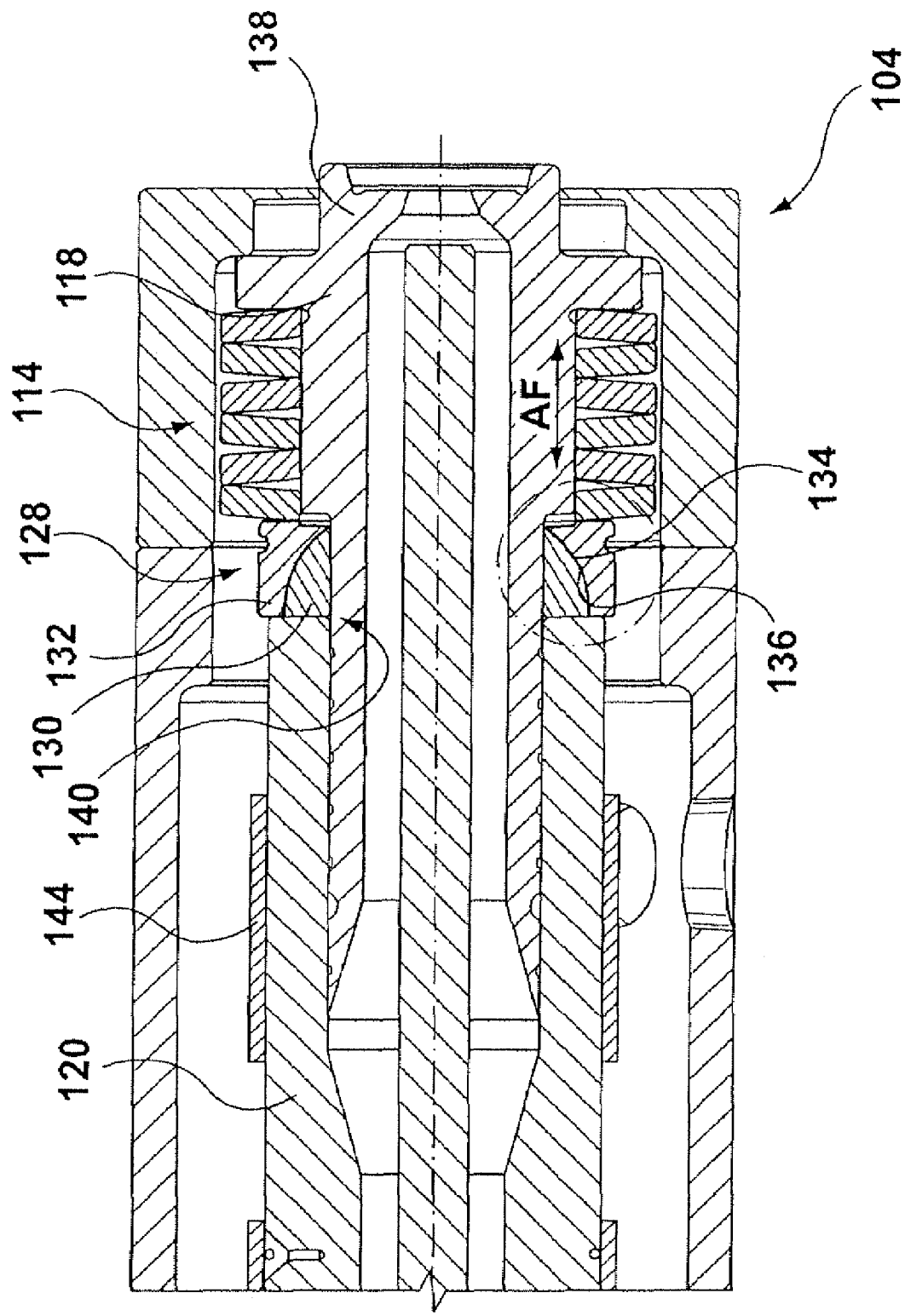
FIG. 17 is a cross-sectional view of the split sprue bar of FIG. 5 but with the collar in an alternative embodiment according to the present invention.

FIG. 17 shows an alternative design to the tapered surfaces 134, 136. In this embodiment, the tapered surfaces 134, 136 are spherical. There are other shapes that may be substituted as well, such as mating bulbous and cup surfaces, and concave and convex surfaces without departing from the present invention.

Although the invention has been described and illustrated with respect to exemplary embodiments thereof, it should be understood by those skilled in the art that the foregoing and various other changes, omissions and additions may be made therein and thereto, without parting from the spirit and scope of the present invention.

What is claimed is:

1. A split sprue bar, comprising:
   a first part slidably mounted to a second part;
   a force creating member operatively mounted between at least a portion of the first part and at least a portion of the second part for applying an axial force; and
   a collar operatively mounted between at least a portion of the first part and at least a portion of the second part, the collar for redirecting at least a portion of said axial force to a radial force.

2. The split sprue bar according to claim 1, wherein the force creating member is either at least one spring, at least one disc, or a cylinder.

3. The split sprue bar according to claim 2, wherein the collar has an outer portion having a tapered inside surface and an inner portion having a tapered outside surface, said tapered inside surface and said tapered outside surface are slidably mounted to each other.

4. The split sprue bar according to claim 2, wherein the collar has an outer portion having a partial spherical inside surface and an inner portion having a partial spherical outside surface, said partial spherical inside surface and said partial spherical outside surface are slidably mounted to each other.

5. The split sprue bar according to claim 2, wherein the collar has an outer portion having a convex inside surface and an inner portion having a concave outside surface, said convex inside surface and said concave outside surface are slidably mounted to each other.

6. The split sprue bar according to claim 2, wherein the collar has an outer portion having a concave inside surface and an inner portion having a convex outside surface, said concave inside surface and said convex outside surface are slidably mounted to each other.

7. The split sprue bar according to claim 3, wherein the at least one spring, at least one disc, or the cylinder applies an axial force to the collar, and the collar redirects at least a portion of said axial force into a radial force, thereby urging the inner portion of the collar into sealing contact with either the first part or the second part.

8. The split sprue bar according to claim 3, wherein the inner portion having the tapered outside surface is integral to the first part or the second part of the split sprue bar.

9. The split sprue bar according to claim 8, wherein the at least one spring, at least one disc, or the cylinder applies an axial force to the collar, and the collar redirects at least a portion of said axial force into a radial force, thereby urging the inner portion of the collar into sealing contact with either the first part or the second part.

10. The split sprue bar according to claim 1, wherein the collar has an outer portion having a tapered inside surface and an inner portion having a plurality of tapered outside surfaces, said tapered inside surface and one of said plurality of tapered outside surface are slidably mounted to each other.

11. The split sprue bar according to claim 10, wherein the force creating member is either at least one spring, at least one disc, or a cylinder.

12. The split sprue bar according to claim 11, wherein the at least one spring, at least one disc, or the cylinder applies an axial force to the collar, and the collar redirects at least a portion of said axial force into a radial force, thereby urging the inner portion of the collar into sealing contact with either the first part or the second part.

13. The split sprue bar according to claim 3, wherein the inner portion is threaded to either the first part or the second part.

* * * * *